US012634257B1

(12) United States Patent
Kaizer et al.

(10) Patent No.: US 12,634,257 B1
(45) Date of Patent: May 19, 2026

(54) DOMAIN NAME SUGGESTION AND REGISTRATION VIA CHATBOT

(71) Applicant: VeriSign, Inc., Reston, VA (US)

(72) Inventors: Andrew Kaizer, Arlington, VA (US); Senthilkumar Kunjithapatham-Saravanan, Aldie, VA (US); Swapneel Sheth, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 18/130,287

(22) Filed: Apr. 3, 2023

Related U.S. Application Data

(63) Continuation of application No. 17/156,901, filed on Jan. 25, 2021, now Pat. No. 11,621,939, which is a
(Continued)

(51) Int. Cl.
  *H04L 61/3015* (2022.01)
  *G06F 16/9535* (2019.01)
  (Continued)

(52) U.S. Cl.
  CPC ...... *H04L 61/3025* (2013.01); *G06F 16/9535* (2019.01); *G06N 20/00* (2019.01);
  (Continued)

(58) Field of Classification Search
  CPC ... H04L 61/3025; H04L 61/302; H04L 51/08; H04L 51/02; H04L 51/32; H04L 63/083; H04L 67/22; G06F 16/9535; G06N 20/00
  See application file for complete search history.

(56) References Cited

U.S. PATENT DOCUMENTS 8,706,503 B2 * 4/2014 Cheyer .................. B60K 35/80
                                                           704/251
9,990,432 B1 * 6/2018 Lai ...................... G06F 16/9535
(Continued)

OTHER PUBLICATIONS

Slack App Directory, Domainr. Retrieved online at: https://slack.com/apps/A13LDCBAQ-domainr?tab=more_info. 2 pages, (2018).
(Continued)

*Primary Examiner* — Richard G Keehn
(74) *Attorney, Agent, or Firm* — McCarter & English, LLP; Michael A. Sartori

(57) ABSTRACT

Techniques for providing domain name suggestions to a user that is a prospective registrant via chatbot are disclosed. The techniques include providing a publicly available online chatbot to the user; requesting domain name generation data from the user via the chatbot and during a chatbot session with the user; receiving domain name generation data based on the requesting; generating a plurality of generated domain names using the domain name generation data; filtering registered domain names out of the plurality of generated domain names to produce a plurality of unregistered generated domain names; offering to register at least one of the unregistered generated domain names to the user; receiving an offer acceptance from the user; directing the user, via the chatbot, to provide information sufficient to register the at least one of the unregistered generated domain names; and facilitating registration of the at least one of the unregistered generated domain names.

19 Claims, 6 Drawing Sheets

Related U.S. Application Data continuation of application No. 15/880,956, filed on Jan. 26, 2018, now Pat. No. 10,904,212.

(51) Int. Cl.

| | |
|---|---|
| *G06N 20/00* | (2019.01) |
| *H04L 9/40* | (2022.01) |
| *H04L 51/02* | (2022.01) |
| *H04L 51/08* | (2022.01) |
| *H04L 51/52* | (2022.01) |
| *H04L 67/50* | (2022.01) |

(52) U.S. Cl.

CPC .............. *H04L 51/02* (2013.01); *H04L 51/08* (2013.01); *H04L 51/52* (2022.05); *H04L 61/302* (2013.01); *H04L 63/083* (2013.01); *H04L 67/535* (2022.05)

(56) References Cited

U.S. PATENT DOCUMENTS

| | | | | |
|---|---|---|---|---|
| 10,277,628 | B1 * | 4/2019 | Jakobsson | H04L 63/1483 |
| 10,467,536 | B1 * | 11/2019 | Lai | G06N 5/04 |
| 10,778,640 | B1 * | 9/2020 | Cholleton | G06N 20/00 |
| 10,904,212 | B1 | 1/2021 | Kaizer et al. | |
| 11,621,939 | B1 | 4/2023 | Kaizer et al. | |

| | | | | |
|---|---|---|---|---|
| 2015/0039599 | A1 * | 2/2015 | Carroll | G06F 16/955 |
| | | | | 707/723 |
| 2015/0058330 | A1 * | 2/2015 | Carroll | G06F 16/9535 |
| | | | | 707/723 |
| 2016/0241510 | A1 * | 8/2016 | Kamdar | H04L 67/01 |
| 2018/0027013 | A1 * | 1/2018 | Wright | H04L 61/4511 |
| | | | | 726/23 |
| 2018/0137179 | A1 * | 5/2018 | Kawanabe | G06F 16/951 |
| 2018/0359198 | A1 * | 12/2018 | Eidem | G06F 40/211 |
| 2018/0365026 | A1 * | 12/2018 | Jernigan | G06F 9/453 |
| 2019/0065614 | A1 * | 2/2019 | Bilsten | G06Q 10/10 |
| 2019/0149488 | A1 * | 5/2019 | Bansal | G06F 9/453 |
| | | | | 709/206 |
| 2020/0137000 | A1 * | 4/2020 | Wu | G06F 16/3329 |
| 2021/0158789 | A1 * | 5/2021 | Wu | G06N 3/08 |
| 2021/0342934 | A1 * | 11/2021 | Lee | H04L 51/02 |

OTHER PUBLICATIONS

US Non-Final Office Action for U.S. Appl. No. 15/880,956, dated Dec. 11, 2019, 15 pages.
US Final Office Action for U.S. Appl. No. 15/880,956, dated Jun. 1, 2020, 14 pages.
US Notice of Allowance for U.S. Appl. No. 15/880,956, dated Sep. 16, 2020, 8 pages.
US Notice of Allowance—corrected for U.S. Appl. No. 15/880,956, dated Dec. 23, 2020, 2 pages.

\* cited by examiner

DOMAIN NAME SUGGESTION AND REGISTRATION VIA CHATBOT

RELATED APPLICATION

This application claims the benefit of, and priority to, U.S. patent application Ser. No. 17/156,901, filed on Jan. 25, 2021, which is a continuation of U.S. patent application Ser. No. 15/880,956, now U.S. Pat. No. 10,904,212, entitled "Domain Name Suggestion and Registration Via", and filed on Jan. 26, 2018, which are hereby incorporated by reference in their entirety.

FIELD

This disclosure relates generally to internet domain names.

BACKGROUND

The domain name system ("DNS") is a hierarchical distributed naming system for resources provided by computer servers that are connected to the internet. It associates domain names to numeric internet protocol ("IP") addresses of internet resources, including resources managed by web hosting providers, which provide the web server computers that serve the web pages associated with domain names. The DNS thus allows computers and humans to access networked resources, including web pages, using names.

A DNS "registry" is an authoritative, master database of all domain names registered in a top-level domain or other domain in which domain names can be registered. A registry includes many hardware computer servers operably coupled to the internet. Internet users generally interact with the registry via intermediaries. For ease of discussion, a registry is identified with its hardware computer servers unless otherwise specified or clear from context.

SUMMARY

According to various embodiments, a computer-implemented method of providing domain name suggestions to a user that is a prospective registrant via chatbot is provided. The method includes providing a publicly available online chatbot to the user; requesting domain name generation data from the user via the chatbot and during a chatbot session with the user; receiving domain name generation data based on the requesting; generating a plurality of generated domain names using the domain name generation data; filtering registered domain names out of the plurality of generated domain names to produce a plurality of unregistered generated domain names; offering to register at least one of the unregistered generated domain names to the user; receiving an offer acceptance from the user; directing the user, via the chatbot, to provide information sufficient to register the at least one of the unregistered generated domain names; and facilitating registration of the at least one of the unregistered generated domain names.

Various optional features of the above embodiments include the following. The requesting domain name generation data may include requesting access to an online chat history of the user; and the receiving domain name generation data may include obtaining the online chat history of the user. The requesting domain name generation data may include requesting login credentials for an online account of the user; and the receiving domain name generation data may include logging in to the online account of the user using the login credentials and obtaining data from the online account. The providing a publicly available online chatbot to the user may include providing the chatbot on a social network web page; and the online account of the user may include an account of the user with the social network. The requesting domain name generation data may include the chatbot asking a plurality of questions of the user; and the receiving domain name generation data may include receiving a plurality of answers from the user in a chatbot session. The plurality of answers may include at least one domain name. The method may include forwarding the information to a registrar; and receiving registration confirmation from the registrar. The directing the user, via the chatbot, to provide information sufficient to register the at least one of the unregistered generated domain names may include handing off the user to a chatbot session with a registrar. The directing the user, via the chatbot, to provide information needed to register the at least one of the unregistered generated domain names may include directing the user to a registration website. The generating a plurality of domain names using the domain name generation data may include extracting keywords from the domain name generation data and providing the keywords to a machine learning system.

According to various embodiments, a computer system for providing domain name suggestions to a user that is a prospective registrant via chatbot is provided. The system includes at least one electronic server computer configured to perform: providing a publicly available online chatbot to the user; requesting domain name generation data from the user via the chatbot and during a chatbot session with the user; receiving domain name generation data based on the requesting; generating a plurality of generated domain names using the domain name generation data; filtering registered domain names out of the plurality of generated domain names to produce a plurality of unregistered generated domain names; offering to register at least one of the unregistered generated domain names to the user; receiving an offer acceptance from the user; directing the user, via the chatbot, to provide information sufficient to register the at least one of the unregistered generated domain names; and facilitating registration of the at least one of the unregistered generated domain names.

Various optional features of the above embodiments include the following. The requesting domain name generation data may include requesting access to an online chat history of the user; and the receiving domain name generation data may include obtaining the online chat history of the user. The requesting domain name generation data may include requesting login credentials for an online account of the user; and the receiving domain name generation data may include logging in to the online account of the user using the login credentials and obtaining data from the online account. The providing a publicly available online chatbot to the user may include providing the chatbot on a social network web page; and the online account of the user may include an account of the user with the social network. The requesting domain name generation data may include the chatbot asking a plurality of questions of the user; and the receiving domain name generation data may include receiving a plurality of answers from the user in a chatbot session. The plurality of answers may include at least one domain name. The directing the user, via the chatbot, to provide information sufficient to register the at least one of the unregistered generated domain names may include handing off the user to a chatbot session with a registrar. The directing the user, via the chatbot, to provide information needed to register the at least one of the unregistered generated domain names may include directing the user to a registration website. The generating a plurality of domain names using the domain name generation data may include extracting keywords from the domain name generation data and providing the keywords to a machine learning system. The at least one electronic server computer may be further configured to perform forwarding the information to a registrar; and receiving registration confirmation from the registrar.

According to various embodiments, a computer-readable media including instructions which, when executed by an electronic computer, perform a method of providing domain name suggestions to a user that is a prospective registrant via chatbot is provided. The method includes providing a publicly available online chatbot to the user; requesting domain name generation data from the user via the chatbot and during a chatbot session with the user; receiving domain name generation data based on the requesting; generating a plurality of generated domain names using the domain name generation data; filtering registered domain names out of the plurality of generated domain names to produce a plurality of unregistered generated domain names; offering to register at least one of the unregistered generated domain names to the user; receiving an offer acceptance from the user; directing the user, via the chatbot, to provide information sufficient to register the at least one of the unregistered generated domain names; and facilitating registration of the at least one of the unregistered generated domain names.

Disclosed embodiments provide many technical advantages over the prior art. Some embodiments facilitate domain name registration using a more conversational, interactive approach, than that of the prior art. Some embodiments provide an improved user interface, via a chatbot, for checking domain name availability and for receiving generated domain name suggestions. Some embodiments leverage a chatbot's ability to dynamically interact with a potential registrant to generate customized domain name suggestions, e.g., using the user's chatbot history. The use of a chatbot represents a technical improvement over the prior art at least because it generates more accurate domain name suggestions and allows a user to register them more quickly, which reduces bandwidth usage, processor usage, storage, and wasted user time. Thus, some embodiments provide an improvement in a computer-related technology, namely, generating and registering domain names. Prior art systems lack the ability to generate domain names targeted for registration by a particular user by using a chat history of the user as a training corpus to a machine learning technique. These and other advantages are disclosed herein.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
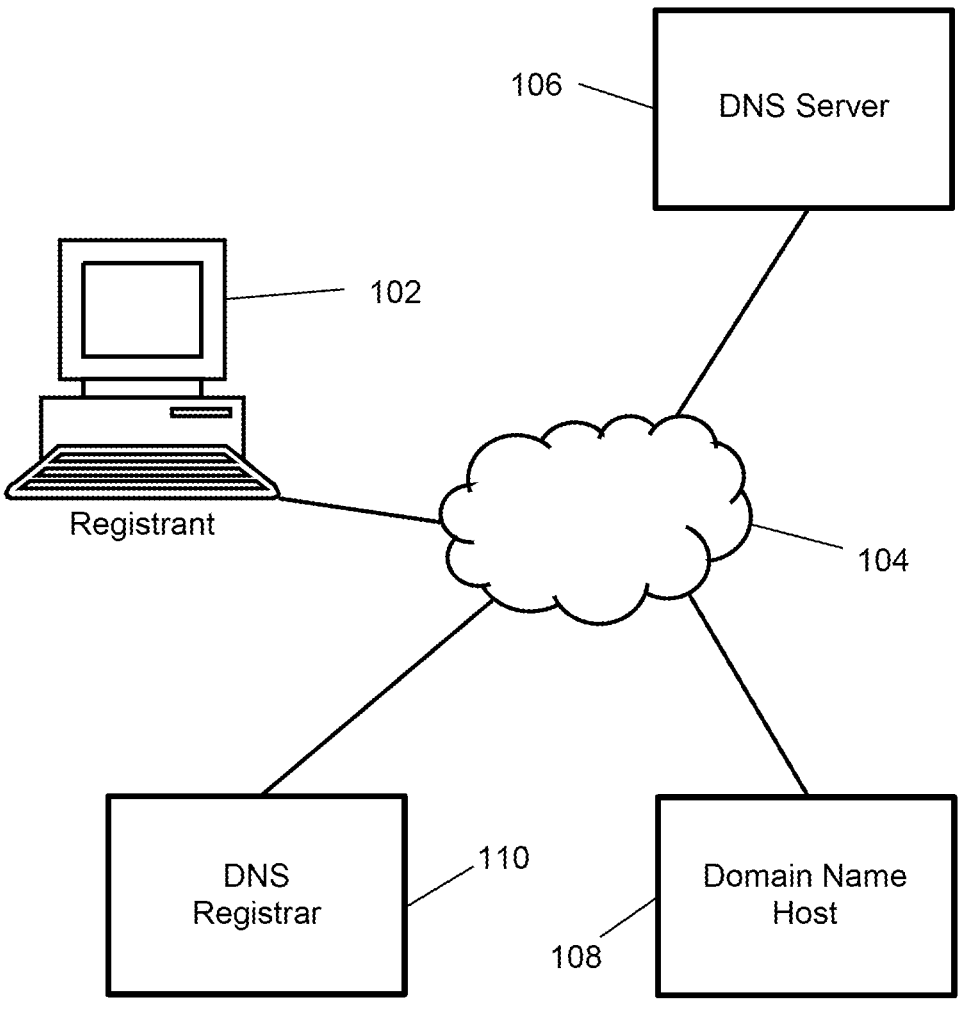
FIG. 1 is a schematic diagram illustrating a portion of the domain name system ("DNS") according to some embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Chatbots are an emerging online communication medium. Chatbots operate as text-based, conversational artificial intelligence agents. Chatbots may be more interactive than a traditional website. Embodiments may utilize chatbots present in any of at least three environments. First, chatbots may appear on a social network webpage. Such chatbots may appear where a user comes to a certain webpage to interact with a chatbot, e.g. a social media website, where a chatbot pops up to greet users. Second, chatbots may appear in a chat application, where such a chatbot may function in a chatroom. Chat applications in general provide a forum where users may type text messages to others present in the forum. Internet Relay Chat (IRC) is an example of such a chatroom. Third, chatbots may appear on stand-alone websites. In such instances, a user may visit a webpage and provide some sort of credentials, e.g. via an access delegation service or system, such as a service that implements the OAuth standard, so that the website can fetch a user's information from a third party to enhance interactions with the chatbot and the website.

Some embodiments provide a domain name chatbot. Such a chatbot operates in an informational or a transactional nature, e.g. a user could ask a domain name chatbot if the domain name example.com is available for registration, and get a response back. Chatbots are a suitable medium with which to promote the registration of domain names to potential registrants, as chatbots leverage the ability to dynamically interact with potential registrants to generate natural domain name suggestions, which will lead to more domain name registrations.

At a high level, some embodiments provide domain name chatbots that operate as follows. A user may interact with the domain name chatbot, with the chatbot existing in, for example, any one of the three use cases described above. The chatbot may (a) ask for information to be used to generate domain name suggestions, (b) ask the user to provide credentials to be used to fetch information to generate domain name suggestions, and/or (c) ask the user for permission to read their chat history to generate domain name suggestions based on a textual analysis. The user may provide responses based on the domain name chatbot's questions. The chatbot may generate a list of viable domain names based on the user's provided information. The chatbot may present the generated domain names to the user. The user may select a domain name to register, move to the previous (respectively, next) domain to consider, or provide more information to the chatbot to generate new suggestions. Once a user identifies a domain name to register, the domain name chatbot may complete the transaction in any of several ways, three of which are mentioned in the following examples. First, the chatbot may facilitate a transaction to register the domain via a registrar application program interface ("API"). Second, the domain name chatbot may communicate with a registrar chatbot, which may support a chatbot API system to support domain name registration via chatbot. Or third, the chatbot may provide the user with a link they can click on to finish the transaction at a website, such as a traditional registrar's website. At the end of the process, the user will have identified and registered a domain name in a natural, conversational approach that improves the user experience by increasing the efficiency and ease-of-use of the DNS and the registration process.

Various embodiments provide novel features and pronounced technical advantages of the prior art. Some embodiments provide a system for domain name sales in a chatbot environment. Some embodiments include the necessary APIs for dynamic, conversational artificial intelligence support to interact with a user. Some embodiments generate improved, user-customized domain name suggestions that lead to identifying and registering a worthwhile domain name. Some embodiments include a chatbot-to-chatbot conversation API, e.g., so that a domain name chatbot can communicate with a registrar chatbot or a name suggestion chatbot. This API may form the foundation of a chatbot-to-chatbot communication channel and ensure a reliable system exists with which chatbots can interface with one another. Some embodiments augment name suggestion algorithms via a user's chat history. Incorporating this information leads to more quickly identifying better candidate domain names that a user would find interesting and/or worthwhile, compared to conventional name suggestion systems, thus improving any name suggestion system.

FIG. 1 is a schematic diagram illustrating a portion of the domain name system ("DNS") according to some embodiments. As depicted in FIG. 1, a domain name (e.g., www.example.com) can be registered to an internet user known as a "registrant" 102 by a company known as a "registrar" 110. In general, registrars compete with one another to register domain names for registrants. An internet user interacts with registrar 110 through the internet 104 to register a domain name, thereby becoming registrant 102 for that name. A registrar 110 may charge the registrant 102 a fee for registering a domain name. Registrar 110 asks registrant 102 to provide various contact and technical information for the registration. Registrar 110 then keeps a record of the contact information and submits the technical information to the DNS registry (not shown).

When any internet user (not shown) attempts to navigate his or her browser to the registered domain through internet 104, the browser contacts DNS server 106, which provides an IP address for domain name host 108 of the registered domain by looking up an appropriate DNS resource record for the domain name. The internet user's browser then navigates to domain name host 108 using its IP address to retrieve the resource of the domain name, e.g., content.

For ease of discussion, a registrar is identified with its hardware computer servers unless otherwise specified or clear from context. Further, an internet user has a hardware client computer. For ease of discussion, an internet user (e.g., registrant 102 or any user interested in registering a domain name) is identified with his or her hardware client computer unless otherwise specified or clear form context.

Figure 2:
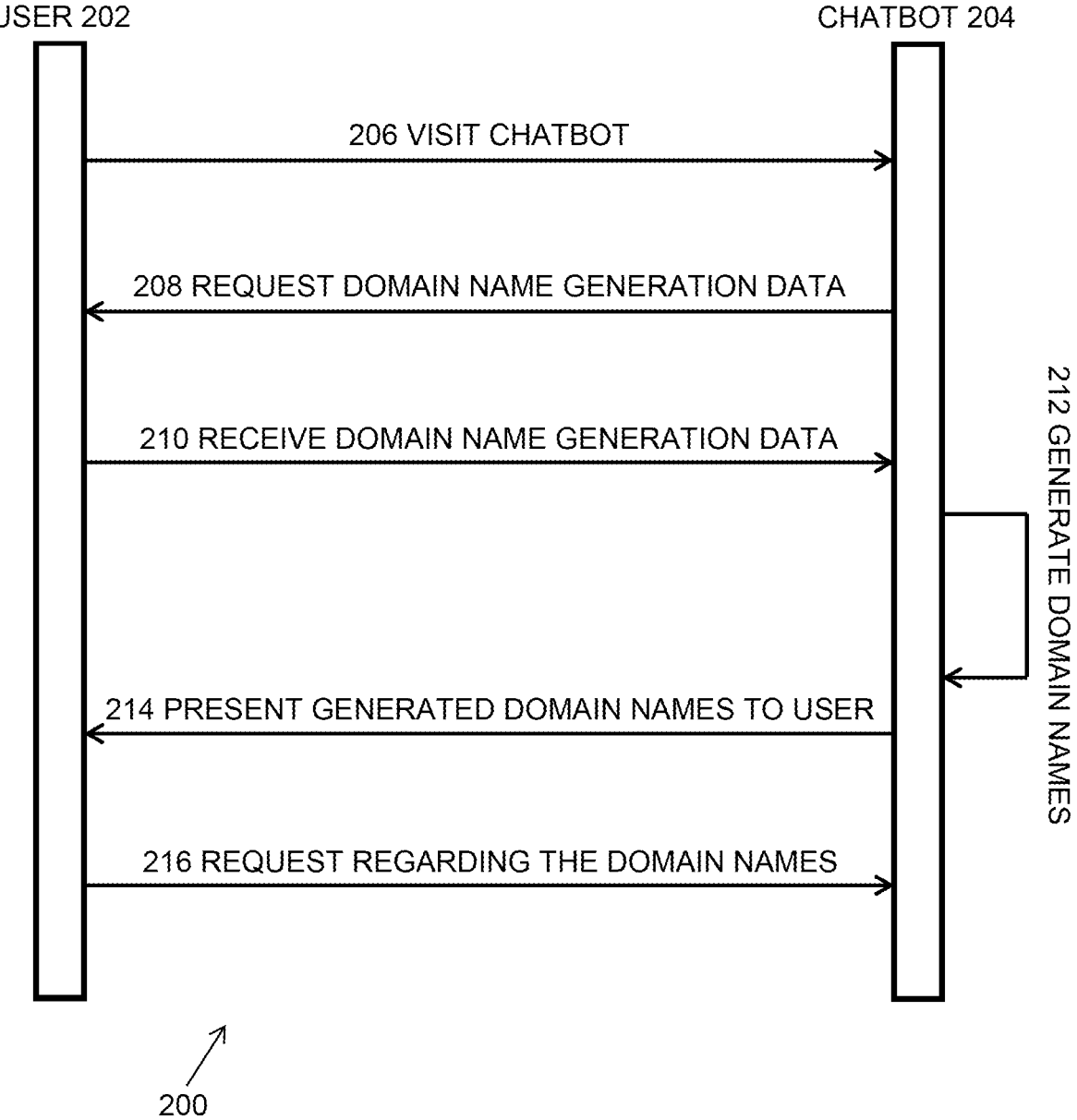
FIG. 2 is a messaging diagram of a process for suggesting domain names in a chatbot environment according to some embodiments.

FIG. 2 is a messaging diagram of a process 200 for suggesting domain names in a chatbot environment according to some embodiments. Process 200 may include user 202 interacting with chatbot 204. Process 200 may be implemented using, for example, the hardware, executable software, and connections as shown and described below in reference to FIG. 6.

As shown in the example of FIG. 2, at 206, user 202 visits chatbot 204. User 202 may visit chatbot 204 in any of a variety of forums and environments. According to some embodiments, user 202 accesses chatbot 204 on a webpage for a social network. The webpage may be a dedicated webpage for the social media chatbot, or it may be a webpage primarily intended for another purpose, but on which the chatbot may appear, e.g., on a pop-up window or reserved section of the webpage. According to some embodiments, user 202 accesses chatbot 204 in a dedicated chat application, such as IRC. Note that the dedicated chat application itself may be hosted on a webpage, for example, or embodied in a standalone application or app. According to some embodiments, user 202 accesses chatbot 204 in a standalone website. On such a website, the user may provide credentials such as a user name and password so that the website can fetch a user's information from a third party to enhance interactions. The user may actively provide such credentials to the website, e.g., by typing into fields, or passively as a background process, e.g., using OAuth.

At 208, which for example may be text or an audible message, chatbot 204 requests domain name generation data from user 202. A backend process of chatbot 204 uses the domain name generation data to generate domain names that are customized or tailored to user 202. Chatbot 204 may use any of a variety of techniques to obtain the domain name generation data from user 202.

Per message 208 and according to some embodiments, chatbot 204 asks user 202 one or more questions intended to discern topics of interest to user 202. Such questions may include, for example, asking about (e.g., asking to list), by way of non-limiting examples: hobbies, interests, work history, education, fitness routines, books of interest, media (e.g., television shows, movies, the press) of interest, leisure activities of interest, travel history and/or aspirations, family, relationships, vehicles, military service, or technology. Chatbot 204 may submit such questions to user 202 in a chatbot session, in which chatbot 204 sends text or audio questions to user 202 within the chatbot environment, and user 202 provides corresponding responses.

According to some embodiments, at 208 the chatbot 204 may request that user 202 provide credentials, such as a user name and password, for an account of user 202 with a third-party platform, such as a social media profile or an email account. Other types of accounts are also possible, not limited to accounts with social media websites and email accounts.

According to some embodiments, at 208 the chatbot 204 may request permission of user 202 to access a chat history of user 202. The chat history may include a history of chatroom messages, sent to and from user 202, within the chatroom of chatbot 204, or within another chatroom. Whether the present or a different chatroom, chatbot 204 may request credentials from user 202, e.g., a username and password to log into the chatroom or confirm access authorization. Such credentials may be retrieved automatically according to some embodiments, e.g., using OAuth.

Thus, after communication(s) 208, chatbot 204 has requested information from user 202 that will be used to efficiently and accurately generate tailored or customized domain names for presentation to user 202.

At 210, chatbot 204 receives a response(s) to its request(s) in message(s) 208 from user 202. The response may include, for example, a user name and password, a permission grant, or a combination of these data, among other things. The response may identify a platform on which the user has an account, e.g., a social media platform, together with login credentials, for example. The response may include permission from user 202 to chatbot 204 to retrieve credentials from user 202 using a process that is otherwise invisible to user 202, e.g., using OAuth.

At 212, a backend process of chatbot 204 generates one or more domain names using the data received or authorized per 210. As a first part of the domain name generation process, a backend process of chatbot 204 obtains the domain name generation data requested at 208. Thus, for example, for embodiments in which chatbot 204 asks user 202 one or more questions intended to discern topics of interest, the backend process obtains and processes the response data. For embodiments in which chatbot 204 asks user 202 for credentials for a third-party platform, the backend process may automatically login and scrape data from the third-party platform account of user 202 using known techniques. For embodiments in which chatbot 204 requests permission to access a chat history of user 202, the backend process may scrape a chat history of the user's account as used in the existing chatbot session, or may login to a different chatbot session, possibly with a different chatbot platform, and scrape data from that account using known techniques. Regardless as to the particular technique used, the first part of the domain name generation process results in the backend system acquiring a corpus of data, generally in text format, that it will use as domain name generation data to generate customized domain names for presentation to user 202.

A second part of the backend domain name generation process of 212 according to some embodiments is to extract keywords from the corpus. Known keyword extraction techniques, such as Term Frequency-Inverse Document Frequency ("TF-IDF") or Rapid Automatic Keyword Extraction ("RAKE"), may be used per this part. The extraction may take place automatically in the background such that user 202 is unaware of its occurrence.

A third part of the backend domain name generation process of block 212 according to some embodiments is to generate domain names from the keywords. The domain names may be generated from the keywords using a variety of techniques. According to some embodiments, the keywords are used to generate domain names by adding prefixes and/or suffixes to the keywords. According to some embodiments, the keywords are used to generate domain names by joining two or more keywords together. According to some embodiments, the keywords are used to generate domain names by performing a deep learning technique to produce a language model using the keywords as a training corpus and then applying the resulting model generatively. This latter technique may generate domain names at the character level of granularity, at the word level of granularity, or at an intermediate level of granularity, such as at the level of tokens. Any of the above techniques may be combined to generate domain names from the extracted keywords.

Once the domain names are generated, they may be filtered to remove any already registered domain names as a fourth part of the domain name generation process of 212. To do this, the backend process may communicate with a registrar or registry, or may be implemented by a registrar or registry, such that it can query the relevant zone file to determine whether or not a given domain name is registered. Based on the query results, the backend process may filter the domain names to remove any that are already registered.

At 214, chatbot 204 presents the filtered, generated domain names to user 202 within the chatbot session. The generated domain names may be presented to user 202 in any of a variety of ways. Some embodiments present the generated domain names to user 202 in simple list form, as part of a text chat message. Some embodiments present the generated domain names to user 202 as a separate popup window as part of the chat session, so that user 202 may view them even after the relevant portions of any text conversion have scrolled past the view of user 202. The domain names may be presented in such a way that one is, or can be, highlighted or otherwise called out as the subject of further commands from user 202.

At 216, user 202 makes a request of chatbot 204 regarding the generated domain names. Note that some embodiments supply user 202 with a command glossary, that is, a list of commands along with descriptions of their functionality, so that the user may easily perform any of the requests described presently. The command glossary may be presented within the chat session in line with the other messages, or in a separate popup window, for example. According to some embodiments, the commands may be invoked by using an attention command "/suggestbot" followed by an instruction, as set forth below. The request itself may be any of several types.

For example, the request may be to change the domain name that is highlighted or otherwise called out to a different domain name. Such a request may take the form of a command to increment or decrement the highlighting or callout within a list so as to move consideration to a next or previous domain name, for example. According to some embodiments, the request may be invoked by user 202 typing into the chatbot session "/suggestbot next" or "/suggestbot previous", as appropriate.

Another request type is a request to generate new domain names. This request may be invoked to cause the backend process of chatbot 204 to generate domain names from the domain name generation data received from user 202 up to this point, and/or it may cause the backend process to request additional information from user 202 via chatbot 204, e.g., by returning to 208 in process 200. According to some embodiments, the request may be invoked by user 202 typing into the chatbot session "/suggestbot generate", for example.

Yet another type of request is to register the domain name currently under consideration (or separately selected specifically for registration). Processes for handling that type of request are described in detail below in reference to FIGS. 3-5.

Figure 3:
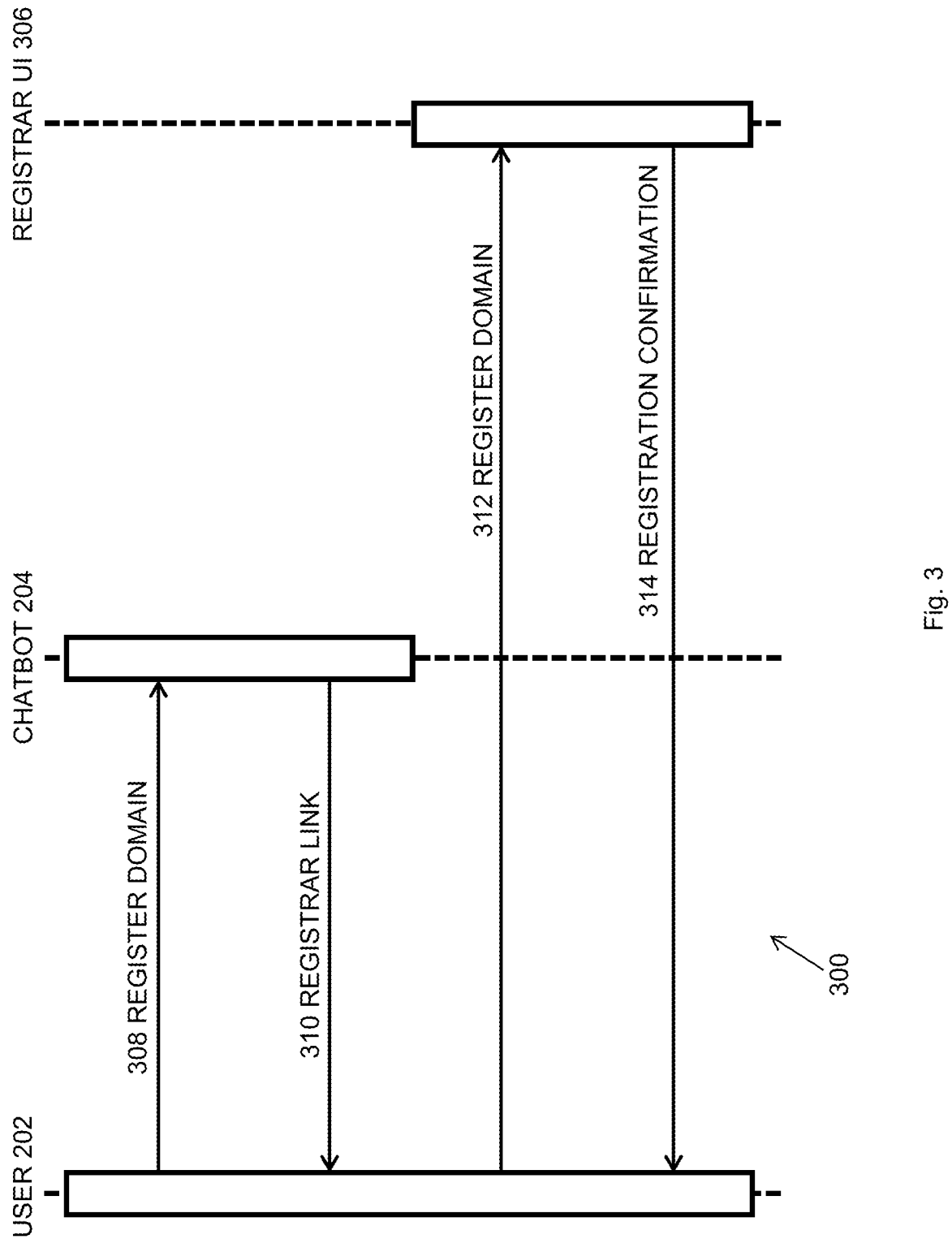
FIG. 3 is a messaging diagram of a process for registering a chatbot-facilitated generated domain name using a registrar website user interface according to some embodiments.

FIG. 3 is a messaging diagram of a process 300 for registering a chatbot-facilitated generated domain name using a registrar website user interface according to some embodiments. Process 300 may be implemented to permit user 202 to register a generated domain per message 216 of FIG. 2. Thus, process 300 may be implemented using, for example, the hardware, non-transitory executable software, and connections as shown and described below in reference to FIG. 6.

Message 308 corresponds to message 216 of process 200, requesting an action. For process 300, however, message 308 is taken to be a request to register a selected one of the generated domain names. The request may include a pre-defined string(s) of characters that the chatbot 204 recognizes as a command(s). For example, the request may be of the form "/suggestbot register", for example, to register a selected generated domain name, or may be of the form "/suggestbot register{example.com}" to register a specified domain name. In various implementations, registering a domain name may include a payment for the registration.

Per message 310, chatbot 204 sends user 202 a link to a registrar's domain name registration webpage, which includes registrar user interface 306. Registrar user interface 306 may be graphical or text-based, and allows user 202 to interact and provide registration and payment information (e.g., name, credit card number, etc.) to register the generated domain name. According to some embodiments, registrar user interface 306 is pre-populated with any information about the user 202 that is known to chatbot 204 by conveying such information in a URL for the registrar's registration webpage.

At 312, user 202 activates the link obtained in message 310. Such activation may open and navigate the web browser being used by user 202 to a domain name registration webpage of a registrar that can register the selected domain. User 202 enters the necessary registration and payment information into registrar user interface 306, and/or finalizes and enters any pre-populated registration information. Note that the actions of user 202 here may not take place within a chatbot session.

Per 314, the registrar responds with a confirmation of the registration of the domain name to the user 202. The confirmation may include registration details and provide user 202 with the opportunity to make any modifications to information associated with the registered domain name (e.g., change hosting, etc.).

Figure 4:
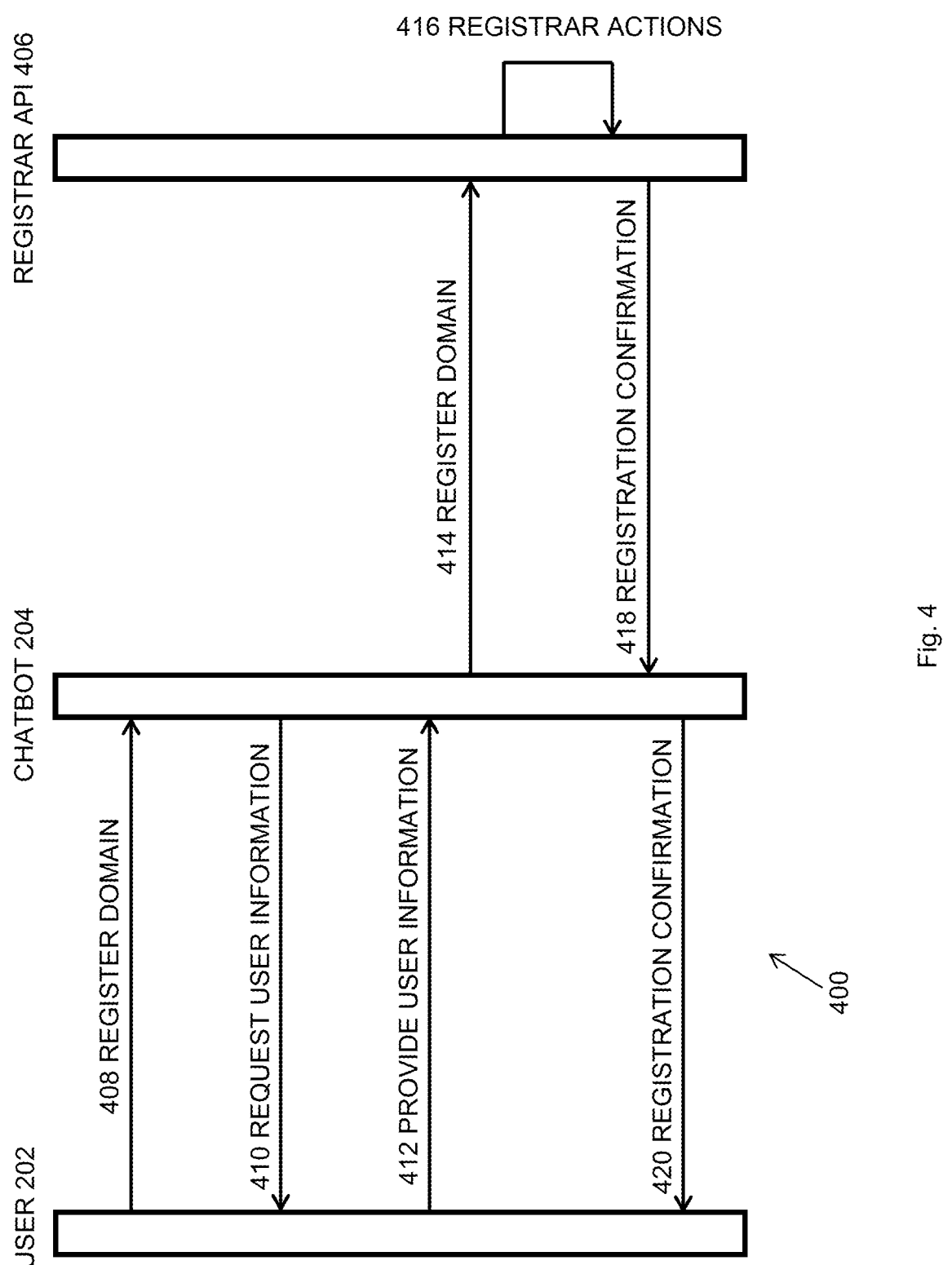
FIG. 4 is a messaging diagram of a process for registering a chatbot-facilitated generated domain name using a registrar application program interface (API) according to some embodiments.

FIG. 4 is a messaging diagram of a process 400 for registering a chatbot-facilitated generated domain name using a registrar application program interface (API) according to some embodiments. Process 400 may be implemented to permit user 202 to register a generated domain per message 216 of FIG. 2. Thus, process 400 may be implemented using, for example, the hardware, executable software, and connections as shown and described below in reference to FIG. 6.

Message 408 corresponds to message 216 of process 200, but for process 400, message 408 is a request to register a selected one of the generated domain names. The request may be of the form "/suggestbot register" or "/suggestbot register{example.com}", for example.

Per message 410, chatbot 204 responds by requesting user information, such as personally identifying information, registration information, and transaction information (e.g., a credit card number). After user 202 provides the requested information at 412, chatbot 204 will forward such information to a respective registrar, which may use the information to register a user-identified domain name and to pay the registrar for its services.

Per message 414, chatbot 204 provides information to registrar API 406 of a registrar that can register the selected domain name. Chatbot 204 may do so in a manner that is invisible to user 202. Chatbot 204 may utilize API commands to accomplish the registration of the domain name.

For example, chatbot 204 may issue a command to registrar API 406 of the form /register?domain={<domain>}&userinfo={<PII>}&payment={<pay>}, where <domain> is the domain name to be registered, <PII> is personally identifying information of user 202, and <pay> is payment information, such as a credit card number.

At 416, the registrar takes the necessary actions to implement registration of the selected domain such that user 202 is the registrant. Such actions may include updating a zone file and confirming payment, for example. Typically, such actions are "behind the scenes" such that user 202 is unaware of their details.

Per message 418, the registrar conveys a registration confirmation to chatbot 204, and per message 420, chatbot 204 forwards the confirmation to user 202. Chatbot 204 may format such information for consumption by user 202. This message may complete process 400.

Figure 5:
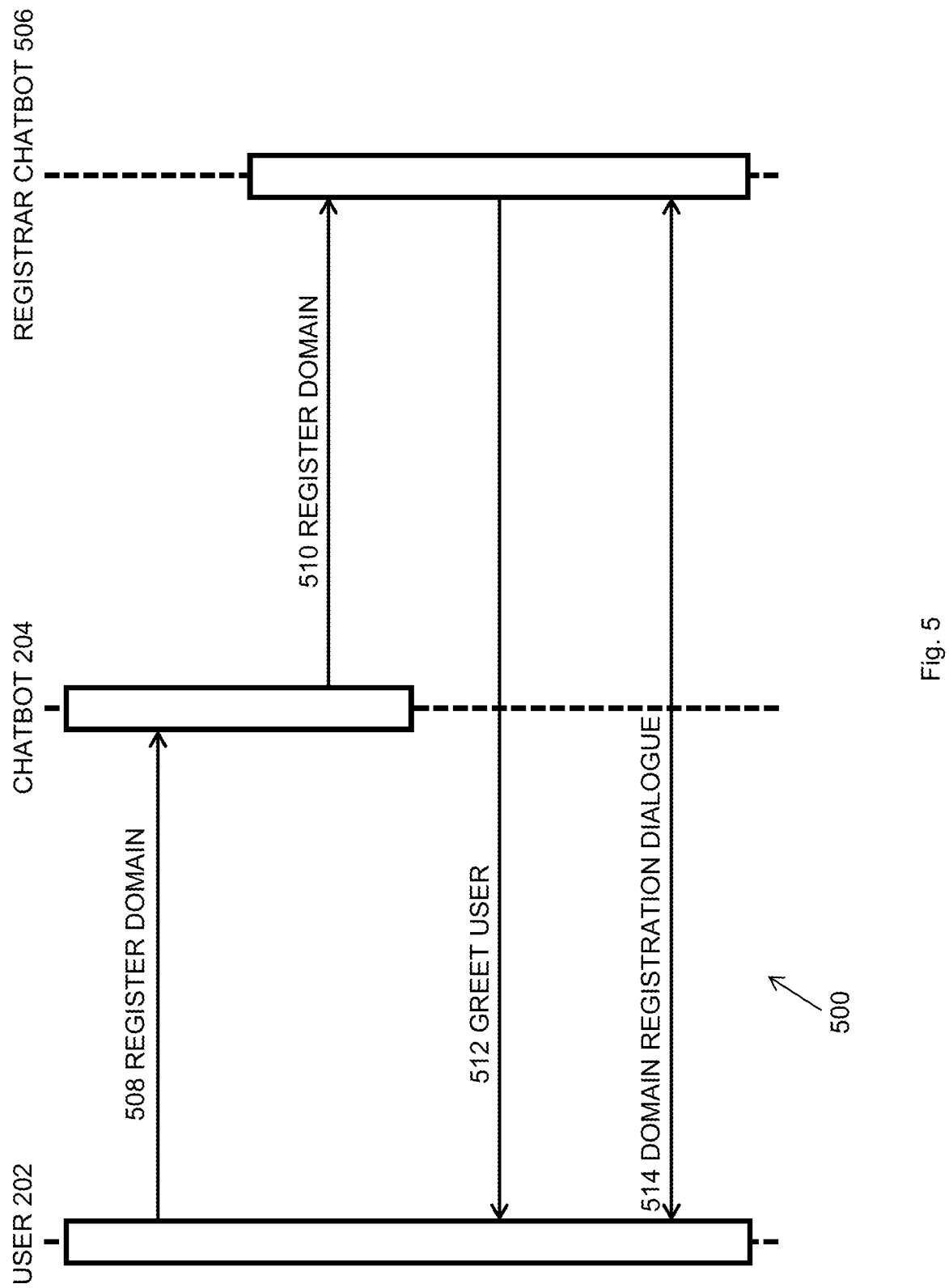
FIG. 5 is a messaging diagram of a process for a completing the registration of a chatbot-facilitated generated domain name using automated chatbot interactions with a registrar chatbot according to some embodiments.

FIG. 5 is a messaging diagram of a process 500 for registering of a chatbot-facilitated generated domain name using automated chatbot interactions with a registrar chatbot according to some embodiments. Process 500 may be implemented to permit user 202 to register a generated domain name per message 216 of FIG. 2. Thus, process 500 may be implemented using, for example, the hardware, executable software, and connections as shown and described below in reference to FIG. 6.

Message 508 corresponds to message 216 of process 200, specifically, a request to register a selected one of the generated domain names. The request may be of the form "/suggestbot register" or "/suggestbot register{example.com}", for example.

Per message 510, chatbot 204 forwards data from the request to registrar chatbot 506. In the implementation shown in this example, the registrar as used in process 500 has a publicly-available chatbot 506 accessible from a webpage. Such a chatbot allows for communicating with the registrar, including making requests and providing information. In particular, such a chatbot permits registering domain names using the chatbot interface itself, using a dialog. Thus, per message 510, chatbot 204 forwards to registrar chatbot 506 an indication that user 202 made a request to register the selected domain. The indication may include information (e.g., text) that identifies the user 202, e.g., the user's handle in the chat session, such that registrar chatbot 506 may contact user 202 in the chatbot session itself. The indication may also include information that identifies the selected domain name.

Per message 512, registrar chatbot 506 greets user 202 within the chat session. The greeting may indicate that the user is now communicating with registrar chatbot 506 instead of chatbot 204, and that registrar chatbot 506 will complete the registration process. A suitable message may be of the form, "Hello! This is the registrar chatbot. I will ask you a series of questions in order to complete your registration. Are you ready?" Such a message may be followed by a listening state, where any affirmative response passes control to 514.

At 514, user 202 and registrar chatbot 506 interactively communicate to finalize registration of the selected domain. Thus, this block may include a series of questions and responses between user 202 and registrar chatbot 506. For example, registrar chatbot may sequentially ask user 202: What domain do you wish to register? What is your full name? What is your mailing address? Please enter a credit card number, expiration date, and security code.

Once user 202 provides the requested information, registrar chatbot 506 proceeds to register the selected domain to user 202. Registrar chatbot 506 may send a confirmation message to user 202 as part of the domain registration dialog 514. This message may complete process 500.

Figure 6:
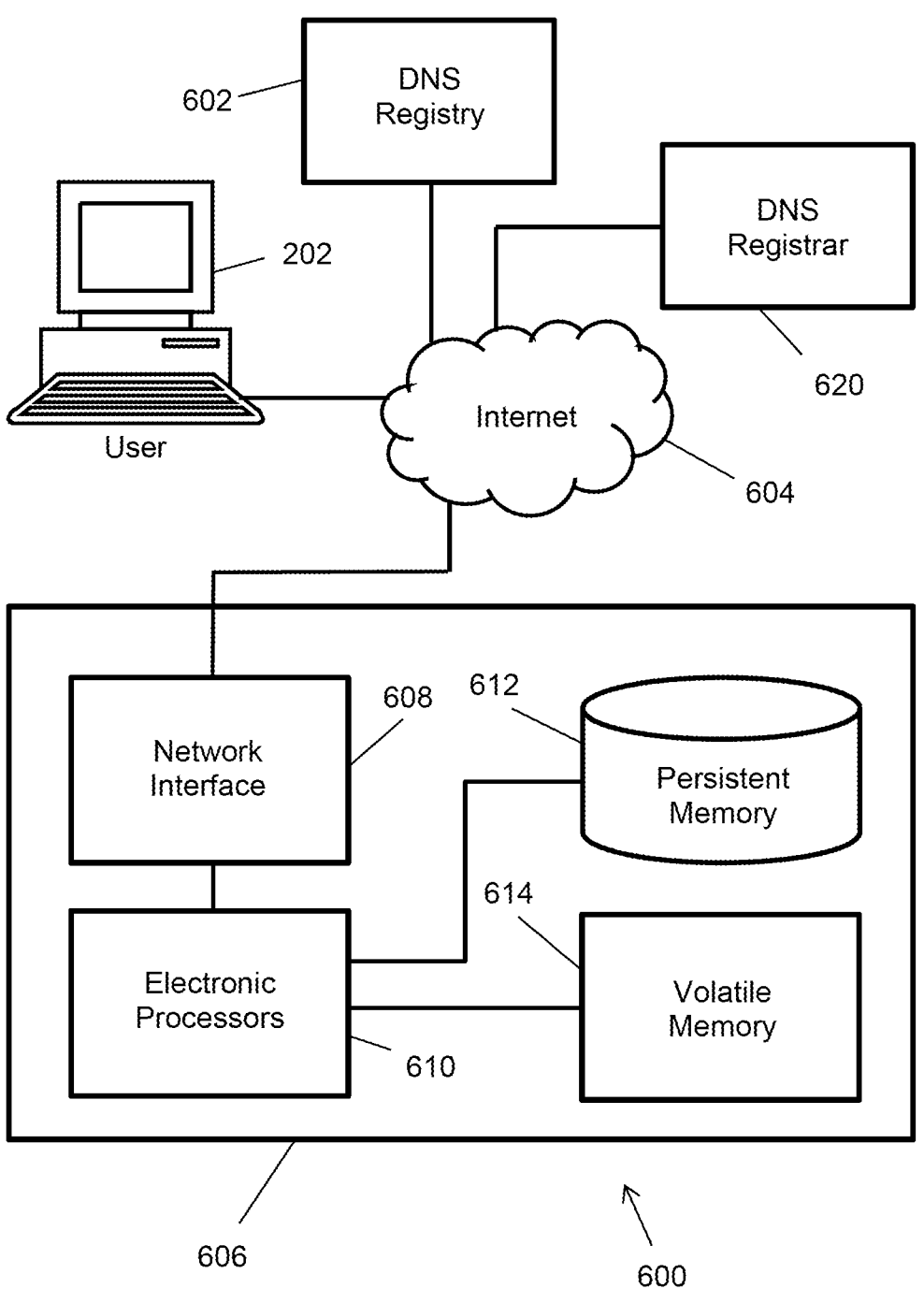
FIG. 6 is a schematic diagram of a system suitable for implementing methods according to some embodiments.

FIG. 6 is a schematic diagram of a system 600 suitable for implementing methods according to some embodiments. As shown in the example of FIG. 6, system 600 may be based around an electronic hardware internet server computer 606, which may be communicatively coupled to the internet 604. Server computer 606 includes network interface 608 to affect the communicative coupling to the internet 604. Network interface 608 may include a physical network interface, such as a network adapter. Server computer 606 may be a special-purpose computer, adapted for reliability and high-bandwidth communications. Thus, server computer 606 may be embodied in a cluster of individual hardware server computers, for example. Alternately, or in addition, server computer 606 may include redundant power supplies. Persistent memory 612 may be in a Redundant Array of Inexpensive Disk drives (RAID) configuration for added reliability, and volatile memory 614 may be or include Error-Correcting Code (ECC) memory hardware devices. Server computer 606 further includes one or more electronic processors 610, which may be multi-core processors suitable for handling large amounts of information. Electronic processors 610 are communicatively coupled to persistent memory 612, and may execute instructions stored thereon to partially or fully effectuate the techniques disclosed herein, e.g., process 200 as shown and described in reference to FIG. 2, process 300 as shown and described in reference to FIG. 3, process 400 as shown and described in reference to FIG. 4, and process 500 as shown and described in reference to FIG. 5. In particular, server computer 606 may provide a chatbot such as chatbot 204. Electronic processors 610 are also communicatively coupled to volatile memory 614.

Server computer 606 is communicatively coupled to DNS registry 602 and/or DNS registrar 620. (According to some embodiments, server computer 606 is provided by a registrar or registry for implementation of the disclosed methods.) The communication between server computer 606 and DNS registry 602 or DNS registrar 620 allows for determining whether generated domain names are currently registered, and also permits users, such as user 202, to register unregistered domain names as disclosed herein.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method of providing a domain name suggestion, the method comprising:
  receiving, via a conversational artificial intelligence provided by a user interface, one or more user inputs from a user;
  generating a first plurality of domain names based on the one or more user inputs, wherein the first plurality of domain names are generated using a language model of a machine learning system, wherein generating the first plurality of domain names comprises:
    extracting one or more keywords from the one or more user inputs; and
    providing the one or more keywords to the machine learning system, wherein the first plurality of domain names are further generated using the one or more keywords;
  filtering the first plurality of domain names to remove one or more registered domain names of the first plurality of domain names to obtain a first domain name suggestion; and
  presenting, via the conversational artificial intelligence, the first domain name suggestion to the user.

2. The method of claim 1, further comprising:
  receiving, via the conversational artificial intelligence, a user input to register a selected domain name from the first domain name suggestion.

3. The method of claim 2, further comprising:
  facilitating registration of the selected domain name of the first domain name suggestion.

4. The method of claim 3, wherein facilitating registration of the selected domain name comprises:
  providing a link to a registrar for registration of the selected domain name.

5. The method of claim 3, wherein facilitating registration of the selected domain name comprises:
  receiving, via the conversational artificial intelligence, one or more further user inputs; and
  providing, to a registrar, domain name registration information to register the selected domain name, wherein the domain name registration information is based on the one or more further user inputs.

6. The method of claim 5, wherein facilitating registration of the selected domain name further comprises:
  providing, via the conversational artificial intelligence, confirmation of registration of the selected domain name.

7. The method of claim 1, further comprising:
  receiving, via the conversational artificial intelligence, a user input to generate additional domain name suggestions.

8. The method of claim 7, further comprising:
  receiving, via the conversational artificial intelligence, one or more additional user inputs; and
  generating a second plurality of domain names based on the one or more additional user inputs.

9. The method of claim 1, wherein the one or more user inputs comprise one or more credentials for one or more accounts of the user with a third-party platform.

10. The method of claim 9, further comprising:

receiving, via the conversational artificial intelligence, user information associated with the one or more accounts of the user with the third-party platform, wherein generating the first plurality of domain names is based on the user information associated with the one or more accounts of the user with the third-party platform.

11. The method of claim 1, wherein the machine learning system is configured to produce the language model based on the one or more keywords.

12. A system for providing a domain name suggestion, the system comprising:

an electronic processor; and electronic memory comprising instructions that, when executed by the electronic processor, configure the electronic processor to perform a method comprising:

receiving, via a conversational artificial intelligence provided by a user interface, one or more user inputs from a user;

generating a first plurality of domain names based on the one or more user inputs, wherein the first plurality of domain names are generated using a language model of a machine learning system, wherein generating the first plurality of domain names comprises:

extracting one or more keywords from the one or more user inputs; and providing the one or more keywords to the machine learning system, wherein the first plurality of domain names are further generated using the one or more keywords;

filtering the first plurality of domain names to remove one or more registered domain names of the first plurality of domain names to obtain a first domain name suggestion; and presenting, via the conversational artificial intelligence, the first domain name suggestion to the user.

13. The system of claim 12, wherein the method further comprises:

facilitating registration of a selected domain name of the first domain name suggestion, wherein facilitating registration of the selected domain name comprises providing a link to a registrar for registration of the selected domain name.

14. The system of claim 12, wherein the method further comprises:

facilitating registration of a selected domain name of the first domain name suggestion, wherein facilitating registration of the selected domain name comprises:

receiving, via the conversational artificial intelligence, one or more further user inputs; and providing, to a registrar, domain name registration information to register the selected domain name, wherein the domain name registration information is based on the one or more further user inputs.

15. The system of claim 14, wherein facilitating registration of the selected domain name further comprises:

providing, via the conversational artificial intelligence, confirmation of registration of the selected domain name.

16. Non-transitory computer-readable media comprising instructions which, when executed by an electronic computer, perform a method of providing a domain name suggestion comprising:

receiving, via a conversational artificial intelligence provided by a user interface, one or more user inputs from a user;

generating a first plurality of domain names based on the one or more user inputs, wherein the first plurality of domain names are generated using a language model of a machine learning system, wherein generating the first plurality of domain names comprises:

extracting one or more keywords from the one or more user inputs; and providing the one or more keywords to the machine learning system, wherein the first plurality of domain names are further generated using the one or more keywords;

filtering the first plurality of domain names to remove one or more registered domain names of the first plurality of domain names to obtain a first domain name suggestion; and presenting, via the conversational artificial intelligence, the first domain name suggestion to the user.

17. The media of claim 16, wherein the method further comprises:

facilitating registration of a selected domain name of the first domain name suggestion, wherein facilitating registration of the selected domain name comprises providing a link to a registrar for registration of the selected domain name.

18. The media of claim 16, wherein the method further comprises:

facilitating registration of a selected domain name of the first domain name suggestion, wherein facilitating registration of the selected domain name comprises:

receiving, via the conversational artificial intelligence, one or more further user inputs; and providing, to a registrar, domain name registration information to register the selected domain name, wherein the domain name registration information is based on the one or more further user inputs.

19. The media of claim 18, wherein facilitating registration of the selected domain name further comprises:

providing, via the conversational artificial intelligence, confirmation of registration of the selected domain name.

* * * * *